2 Sheets—Sheet 1.

J. SARGENT.

Combined Time-Locks, Combination Locks, and Bolt-Works for Safes.

No. 7,947. *Fig.* Reissued Nov. 13, 1877.

Attest:
H. L. Perrine.
J. A. Rutherford

James Sargent.
Inventor.
By. James L. Norris.
Attorney.

THE NORRIS PETERS CO., PHOTO-LITHO., WASHINGTON, D. C.

2 Sheets—Sheet 2.

J. SARGENT.

Combined Time-Locks, Combination Locks, and Bolt-Works for Safes.

No. 7,947. Reissued Nov. 13, 1877.

Attest:
H. L. Perrine.
J. A. Rutherford

James Sargent.
Inventor:
By James L. Norris
Atty.

THE NORRIS PETERS CO., PHOTO-LITHO., WASHINGTON, D. C.

UNITED STATES PATENT OFFICE.

JAMES SARGENT, OF ROCHESTER, NEW YORK

IMPROVEMENT IN COMBINED TIME-LOCK, COMBINATION-LOCK, AND BOLT-WORK FOR SAFES.

Specification forming part of Letters Patent No. 195,539, dated September 25, 1877; Reissue No. 7,947, dated November 13, 1877; application filed October 8, 1877.

*To all whom it may concern:*

Be it known that I, JAMES SARGENT, of the city of Rochester, in the county of Monroe and State of New York, have invented a certain new and useful Improvement in Combined Time-Locks, Combination-Locks, and Bolt-Work for Safe and Vault Doors; and I do hereby declare that the following is a full, clear, and exact description of the construction and operation of the same, reference being had to the accompanying drawings, in which—

Figure 1:
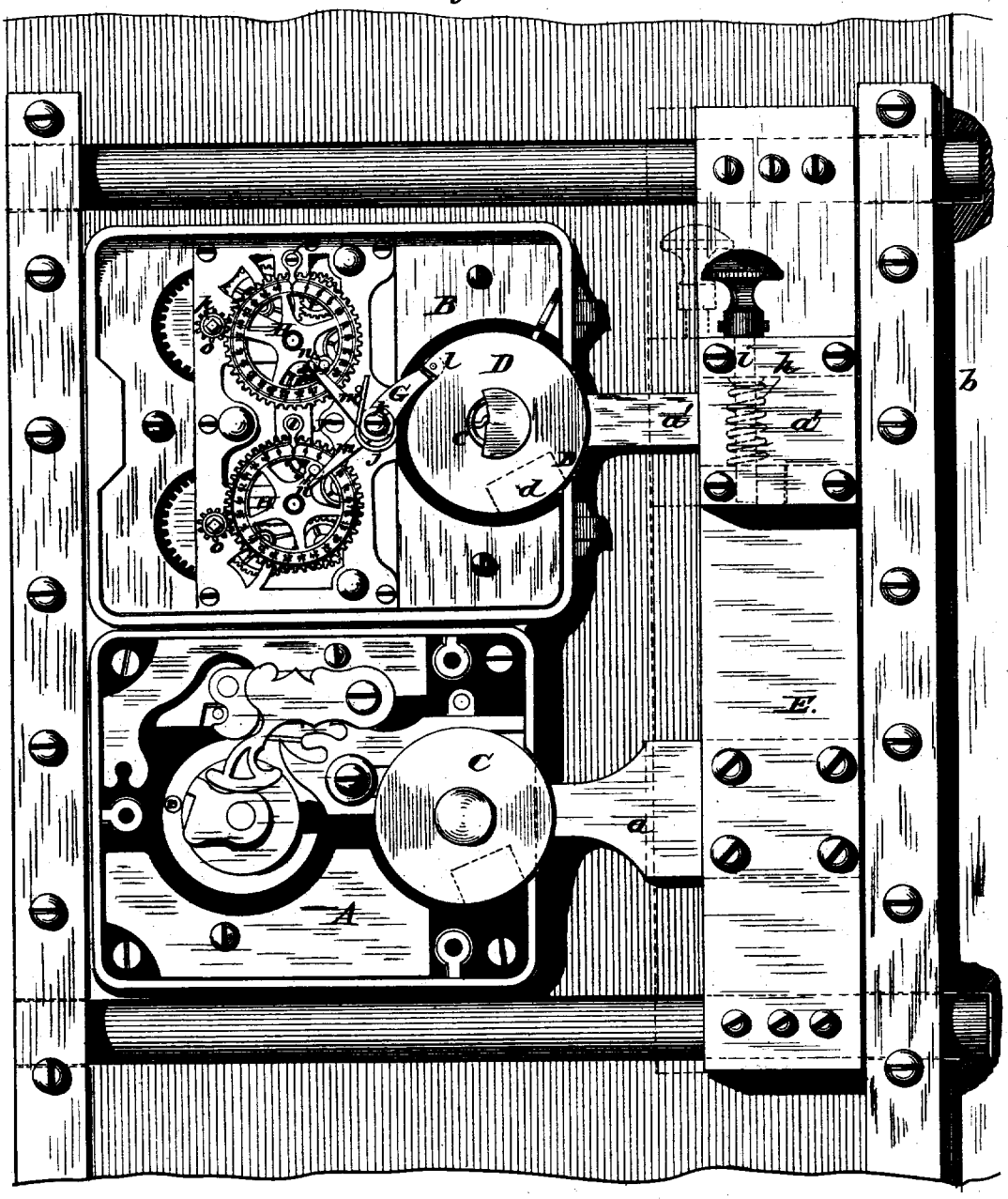
Figure 2:
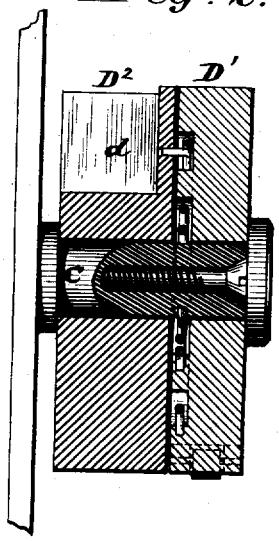
Figure 3:
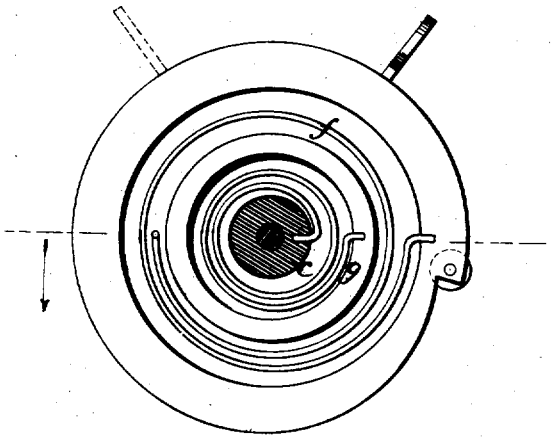
Figure 4:
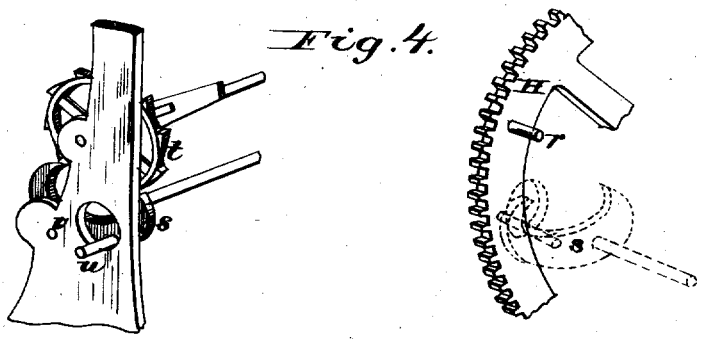
Figure 5:
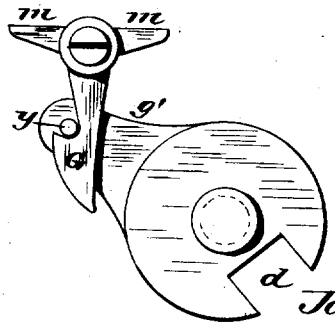

Figure 1 illustrates a portion of a safe or vault door having thereon a time-lock and a combination-lock, both of said locks being represented in a locked condition, with the bolt-work projected and locked. Fig. 2 illustrates one form of lock-bolt or obstruction for use in a time-lock. Fig. 3 illustrates an inside view of said lock-bolt or obstruction. Fig. 4 represents detached views of the pallet and escape-wheel, and a portion of one of the revolving dials. Fig. 5 illustrates another form of lock-bolt or obstruction for use in connection with the time-lock for admitting of locking or unlocking of the bolt-work.

My invention consists, first, in the combination with a time-lock and a combination or key lock, both constructed to be applied on a safe, vault, or other door, so as to rest against or connect with the bolt-work on said door, and provided with a device whereby the bolt-work may be retained in the unlocked position for shutting the door, and be automatically locked by the lock-bolt or obstruction of the time-lock, and mechanically by the combination or key lock, the whole so arranged that the bolt-work cannot be withdrawn when locked till both locks have been unlocked; second, in the combination of a time-lock and a combination or key lock, both constructed to be applied on a safe, vault, or other door, so as to rest against the bolt-work, each of said locks being provided with a lock-bolt or obstruction, that of the combination-lock or key-lock being of the usual construction, while that of the time-lock has an opening or offset, which is automatically brought into and out of coincidence with the tongue of the bolt-work, whereby the bolt-work may be retained in the unlocked position for shutting the door, and prevented from being retracted when locked, until both locks have been unlocked; third, in the combination, with the bolt-work of a safe or vault door, of a combination-lock, controllable mechanically from the exterior of said door with a time-lock, controllable automatically for unlocking by the operation of its time mechanism, both of said locks arranged to control the locking and unlocking of the bolt-work, so that said safe or vault door cannot be opened when locked until both of said locks have been unlocked or released their dogging action to enable the door to be opened, substantially as hereinafter described.

The construction and arrangement of the time-lock will be more fully hereinafter described; but it is evident that any form or construction of a time-lock may be used as a part constituting one element of the combination called for in my claims.

Combination or key locks have heretofore been used by bankers and others for the purpose of preventing the unlocking of the bolt-work of a safe or vault door; but as such locks are "set on" combinations, or operated by means of keys, burglars can force the holders of the "combination" or key to unlock the combination lock or locks, and thus admit of the bolt-work being retracted and the door thrown open. Therefore such locks are not a safeguard against robbery.

Clock-locks have also been used upon safe or vault doors for the purpose of opening the door at a predetermined hour, thus placing it beyond the power of any person, until the arrival of the appointed time, to open the door; but as far as I am aware such clock-locks have either been used singly on a safe-door, so that, when said lock released the bolt-work or other fastening of the said door, it was unlocked, and the door could be opened by any one, or, in another instance, when a time-movement had been combined with a combination-lock in such a manner that the two really constituted but a single lock, the time mechanism constructed and provided with a lever to engage with the fence or dog of the combination-lock, so that the entire mechanism of the time-movement and combination-lock really constitute but a single lock, as aforesaid, the result being that, if violence be applied to such a lock through the dial-spindle or otherwise, the efficiency of the time-movement will be destroyed.

Referring to the drawings, the letter A designates a combination or key lock, and B the time-lock. These locks are illustrated as being upon a portion of a safe or vault door, with the bolt-work projected and locked, the lock-bolts or obstructions being in a locked position. The lock-bolts or obstructions C D are, in the present example, shown as being constructed each with a notch or recess, so that, when said notches or recesses are brought in line with the tongue-pieces or studs *a a'*, arranged upon the carrying-bar E of the bolt-work, they (the said tongue-pieces or studs) can, by a movement of the bolt-work, be made to enter said notches or recesses, and thus the bolt-work can be retracted and the safe or vault door thrown open. When the bolt-work is projected or cast so as to lock the safe or vault door, the lock-bolts or obstructions can be brought into a locked position, the lock-bolt or obstruction of the combination-lock being placed in a locked position by mechanically operating the dial-spindle, which controls the movements of the tumblers and other portions of the lock, while the lock-bolt or obstruction of the time-lock will automatically bring itself into a locked position after the door is closed, whereby the door of the safe or vault will be locked and guarded by two locks, one of which is operated from the exterior mechanically, while the other operates on the interior automatically, there being no hole through the door whereby it might be operated upon by any mechanical means.

The combination-lock and the time-lock are separate from each other in performing their office or function with respect to the bolt-work on the safe or vault door, and each of said locks should be complete in itself, and so constructed that they may be placed at any position on a safe or vault door.

The combination or key lock should be located in line with the dial-spindle or key which operates it, but the time-lock may be located anywhere on the safe or vault door where sufficient space is present for it, and the tongue-pieces or studs on the carrying-bar of the bolt-work may be of any required length, bent or otherwise arranged so as to connect with or rest against the lock-bolts or obstructions, when the latter is moved to the proper position for obstructing or dogging the bolt-work, and prevent its retraction or unlocking, thus retaining the door in a locked position until both locks have been unlocked.

When it is desired to lock or fasten the bolt-work of the safe or vault door by means of a combination-lock and a time-lock, some mechanical arrangement or device should be employed to enable the lock-bolt or obstruction of the time-lock to be set or adjusted while the safe-door is open and the bolt-work in a retracted or unlocked position, so that the door can be closed to admit of the bolt-work being projected or cast. The lock-bolt or obstruction will, as hereinafter set forth, present its lock-bolt or obstruction automatically, thus securing the door in a locked position until the arrival of the time determined by the time mechanism or register, at which time the lock-bolt or obstruction will be automatically moved and brought into a position for admitting of the releasing and unlocking of the bolt-work, so that said door can be opened To accomplish such mechanical arrangement or device in the time-lock, a lock-bolt or obstruction is employed in the time-lock itself, or by means of an adjustable tongue-piece or stud connected with the carrying-bar of the bolt-work—such, for instance, as those illustrated in Figs. 1, 2, 3, 5 of the accompanying sheets of drawings.

The lock-bolt or obstruction D, illustrated in Figs. 1, 2, and 3, is one of the devices that should be employed to enable the time-lock to be set while the bolt-work remains in a retracted or unlocked position, so that the bolt-work will remain in such retracted position without interfering with the time-lock, the combination-lock, of course, during such interval, being in an unlocked position, and through such mediums the bolt-work when projected for closing the door will be held in a locked position by the automatic movement of the lock-bolt or obstruction of the time-lock, and by the lock-bolt of the combination-lock, which is brought into a locked position by the mechanical operation of the dial-spindle.

The lock-bolt or obstruction of the time-lock is constructed in two parts, $D^1 D^2$, adapted to turn independently of the other on the same bearing *c*. The inner part, $D^2$, has a notch or recess, *d*, into which the tongue-piece or stud on the carrying-bar enters when the bolt-work is retracted, so as to open the safe or vault door if the combination-lock be unlocked. The said inner part $D^2$ is connected to the outer part $D^1$ by a spring, *f*, resting in a cavity or recess in the side of the outer part. The outer part $D^1$ is also connected by a spring, *g*, with the bearing *c*. The spring *g* being connected with the outer part $D^1$, and with its bearing *c*, causes the outer part $D^1$ to be moved or turned on its axis, so that the notch, recess, or offset *d* of the inner part $D^2$ is brought into a position to allow the tongue or stud *a'* of the carrying-bar to enter it, and thus the bolt-work can be retracted, and when so retracted the outer part $D^1$ is turned or moved, and made to connect and engage with the portion of a yoke, while the inner part $D^2$ remains stationary, being prevented from moving or turning on its axis by the tongue-piece or stud on the carrying-bar resting in the notch or recess of the part $D^2$ of the lock-bolt or obstruction.

The parts constituting the lock-bolt or obstruction, and forming a part of the time-lock, being thus constructed, arranged, and adjusted, the time mechanism having been previously wound, and the dials set for a certain predetermined time, the bolt-work is projected or cast, when the lock-bolt or obstruction of said time-lock will automatically be brought into a locked position, and the door of the safe or vault securely guarded by a combination-lock, if it be locked, and a time-lock, and the bolt-work be prevented from being retracted, or the safe or vault door opened until both locks have been unlocked.

The parts $D^1$ $D^2$ composing the lock-bolt or obstruction are supplied with suitable stops, by which their motion or throw is limited, so as to bring the notch, recess, or offset of the part $D^2$ in proper position in its rotation to coincide with the tongue-piece or stud on the carrying-bar of the bolt-work.

In lieu of forming the lock-bolt or obstruction in two parts, as above described, it has been found eminently practical and successful to employ a lock-bolt or obstruction made in a single piece, or as an integral. Such a lock-bolt or obstruction is shown in Fig. 5 of the drawing, and, as it will be perceived, it is constructed with a notch, recess, or offset, to admit of a tongue-piece or stud entering it when the bolt-work is retracted for unlocking the safe or vault door, and said lock-bolt or obstruction is likewise provided with an arm, *g'*, having a pin or stud for connecting or engaging with a yoke in such a manner that when said arm and yoke are in connection the lock-bolt or obstruction will be placed so as to prevent the retraction of the bolt-work, and when said arm and yoke are disconnected through the medium of revolving dials, to be hereinafter mentioned, the lock-bolt or obstruction will be automatically brought to a position for allowing the bolt-work to be retracted, and such automatic movement of the lock-bolt or obstruction is due to the action of the arm *g'* acting as a counterweight.

When a lock-bolt or obstruction of the character last described is employed, some provision must be made for adjusting and setting the time-lock or the lock that measures time, prior to closing the safe or vault door, and this must be accomplished while the bolt-work is in a retracted position; therefore, to enable such to be done, there is arranged on the carrying-bar of the bolt-work a socket or bearing, which is provided with a movable tongue-piece and a spring-bolt, constructed and arranged in such a manner that when the spring-bolt is moved out of contact with the socket or bearing of the movable tongue-piece or stud of the carrying-bar, it, together with the bolt-work, can be retracted as the socket or bearing on said carrying-bar moves or slides along the tongue-piece or stud in a longitudinal direction, one end of it bearing upon the lock-bolt or obstruction of the time-lock, and in such condition the safe or vault door can be closed, and when the bolt-work is projected or cast into the jamb of the door, the socket or bearing moves along the tongue-piece until the spring-bolt engages with it, when it—the socket or bearing—will be automatically locked in place, and the bolt-work, performing its office, will securely fasten the safe or vault door, upon which the combination-lock is placed, together with the time-lock.

From the foregoing it will be seen that the lock-bolt or obstruction shown in several figures are each stationary except during the brief intervals of time when locking or unlocking is being effected, and that each is adapted to be turned on its pivot or bearing for obstructing or dogging the bolt-work for preventing its retraction or for releasing the bolt-work at the time appointed, so that it can be retracted; and it should be noticed that the lock-bolt or obstruction of the time-lock is so located in the time-lock that if pressure be exerted upon the lock-bolt or obstruction by force applied to the bolt-work, such pressure will not be transmitted to the delicate workmanship forming part of the time-lock, for the lock-bolt or obstruction, so to speak, is isolated from the time mechanism, in order to bring and retain the lock-bolt or obstruction in a position to have the same obstruct and prevent the retraction of the bolt-work, or to move it to release the bolt-work, whereby the same may be retracted.

There is arranged within the time-lock a yoke, G, which is capable of being oscillated or turned on its axis or pivot, said yoke being acted on by two rotating dials, H H, in such a manner that said yoke will be operated by either or both of said dials at the predetermined time for which said revolving dials have been set.

In the example shown in the time-lock in Fig. 1, the yoke engages under a stop, *l*, preferably a roller, arranged on the lock-bolt or obstruction, and when the latter is brought into a position for obstructing the bolt-work, to prevent its retraction until the arrival of the predetermined time, while in the example shown in Fig. 5 said yoke connects or engages with the lock-bolt or obstruction.

In both examples the yoke retains the lock-bolt or obstruction in a position for obstructing and preventing the retraction of the bolt-work until the arrival of the predetermined time for which the revolving dials carrying pins have been set.

The arms or members *m m* of the aforesaid yoke extend over a portion of the revolving dials, from which project pins, and when either of said pins comes in contact with the arms or members of said yoke, which will occur at the arrival of the time previously determined upon when setting the revolving dials, it (the said yoke) will be operated or turned on its axis or pivot, and release the lock-bolt or obstruction, and leave the same to be brought into a position to permit the bolt-work to be retracted, which is accomplished by turning the knob or handle connected with the carrying-bar, said knob or handle being on the outside of the safe or vault door.

It is preferred to use two independent time mechanisms, each connected with and operating one of the revolving dials, so that if one of the time mechanisms should accidentally stop the other would be sure to operate the yoke, and by its movement release the lock-bolt or obstruction, which would automatically assume such a position as to present an unobstructed pathway for the tongue-piece or stud to move in, and thus the bolt-work could be released and be left free to be withdrawn or retracted.

The revolving dials are cogged—that is, provided with teeth, which engage with the arbor O of the mainspring-barrel, either directly or by means of the pinion *p* attached to said arbor, or through intermediate gearing—so that the setting of the time mechanism for operating the yoke at any given time will necessarily wind up the time mechanism, to the extent, at least, that it will unwind by the arrival of the predetermined time at which the lock-bolt or obstruction is to be released for enabling the bolt-work to be retracted.

The revolving dials are indexed or marked with a scale from zero, (0,) upward to 48, or any other number corresponding with the longest interval the time-lock is to present its lock-bolt or obstruction to obstruct the bolt-work at one time—say, from Saturday night to Monday morning. This scale is used in conjunction with a pointer or index, *e*, arranged in the time-lock above the revolving dials.

In setting the time-lock the revolving dials are turned or moved backward from zero (0) to any number in the scale that will indicate the number of hours the safe or vault door is to remain closed or locked, and the pins *n* of the revolving dials must be so adjusted with reference to the yoke as to come in contact with the arms or members *m m* of the yoke, so that either or both of the said arms or members will act upon the yoke, causing it to move so as to release the lock-bolt or obstruction of the time-lock when the zero (0) mark arrives at the index or pointer.

The winding up of the time mechanism and the setting of the revolving dials is performed simultaneously by imparting proper motion to the arbor *o* of the mainspring-barrel.

The revolving dials are provided with a pin, *r*, as shown in Fig. 4, the same serving as a stop.

On the pallet *s*, which engages with the escape-wheel *t*, is a pin, *u*, which projects out through a slot, *v*, of the stationary time-mechanism frame, the whole arranged in such a manner that as soon as the revolving dial has acted upon the yoke for causing it to release the lock-bolt or obstruction, the pin *r* of the said revolving dial will strike the pin *u* of the pallet, and lock the latter in the escape-wheel, thereby stopping the time mechanism, so that there will be no loss of power, as it is intended that the time-lock should be wound up when first finished, prior to adjusting in place the revolving dials; and, further, by stopping the time mechanism, as above described, the revolving dials cannot get out of position with respect to the index or pointer.

By my invention the time-lock cannot be reset without winding, for the pins of the revolving dials, resting in contact with the arms or members of the yoke, prevent it from being brought into action with the lock-bolt or obstruction until the revolving dials have been moved back the number of hours for which it is designed to obstruct the bolt-work. Thus the resetting of the time-lock requires rewinding of the time mechanism as a necessity, and hence no danger of it being unlocked accidentally during the period of hours for which it is set.

The dial-wheel is turned back to set the time-lock by a key applied at the winding-arbor *o*.

By the means above described I obviate a great objection to common clock-locks, which run on until they run down, thus subjecting the lock to the danger of a "lock-out," caused by neglect of winding.

By this means the time-lock cannot be set without winding, for the pins *n n*, resting in contact with the arms of the yoke, it (the yoke) cannot be engaged with the lock-bolt or obstruction until the dial-wheels have been moved back to set the lock, as before described.

By combining an independent time-lock of the character described, and a combination or key lock, I produce an effect or result which cannot be produced by a time-lock alone, or by two or more combination-locks together.

The time-lock serves as a safeguard by night, in connection with the combination-lock, for holding the bolt-work in a locked condition; but when the time-lock releases the bolt-work at the appointed hour, the bolt-work will remain locked, and the safe or vault door closed, until the combination-lock is unlocked by the holder of the combination on which said lock is set, when the bolt-work can be retracted and the door opened, thus leaving the time-lock free from performing any locking action, which leaves the combination-lock free for use during the day for locking or unlocking the safe or vault door—an important desideratum present in my invention.

If the time-lock present on the safe or vault door is set for holding the bolt-work from the time the bank closes in the afternoon to release the bolt-work at a certain hour the next morning, it will admirably and with certainty perform its office, leaving the combination-lock to be opened before the bolt-work can be retracted; and should the officer of the bank holding the combination be seized during the night, carried to the bank, and forced to open the combination-lock, the time-lock will remain intact, and cannot be opened by the burglars or the officer in charge of the combination. Such results cannot be accomplished by a time-lock alone, because when it releases its bolt-work the safe or vault door is absolutely unlocked, and no lock present for use during the day; nor by two or more combination-locks together, because the holders of the combinations may be taken to the bank and forced to open the locks. Neither can tampering with the combination-lock affect the time-lock.

The combination-lock may be punched from its position by burglars; but then the time-lock, being separate and independent from it, cannot be affected or disturbed, because there is no opening through the door by which it can be reached. It is therefore superior to a lock which has the time-movement combined directly with the combination-lock, both forming one lock, in which case any violence to the lock-work disarranges the time-movement.

Another advantage of my invention is the capability of the separate locks being applied on different parts of the safe or vault door, with respect to the bolt-work, indifferently.

The bolt-work on different safe or vault doors is frequently such that the time-lock and the combination or key lock cannot be applied together; but in such case the time-lock may be attached at the most convenient location, as no opening through the door is requisite.

The time-lock can be applied with ease and facility to the doors of old safes or vaults having the combination or key lock already thereon, thus securing the advantage of a time-lock and a combination or key lock without the necessity of removing the old lock.

I do not claim, broadly, a time-lock of any peculiar construction; nor do I claim two or more combination-locks combined with the bolt-work of a safe or vault door, as such are old and well known.

What I claim, and desire to secure by Letters Patent, is—

1. The combination, with the bolt-work of a safe or vault door, of a time-lock and a combination or key-lock, both applied independently on a safe, vault, or other door, so as to rest against or connect with the bolt-work on said door, and provided with a device whereby the bolt-work may be retained in the unlocked position for shutting the door, and be automatically locked by the time-lock and mechanically by the combination or key lock when the bolt-work is cast, the whole so arranged that the bolt-work cannot be withdrawn when locked till both locks have been unlocked.

2. The combination of a time-lock and a combination or key lock, both constructed to be applied on a safe, vault, or other door, so as to rest against the bolt-work, and provided with a lock-bolt or obstruction having an opening or offset, which is automatically brought into and out of coincidence with the tongue of the bolt-work, whereby the bolt-work may be retained in the unlocked position for shutting the door, and prevented from being retracted when locked until both locks have been unlocked.

3. The combination, with the bolt-work of a safe or vault door, of a combination or key lock controllable mechanically from the exterior of said door, with a time-lock having a lock-bolt or obstruction for locking and unlocking controllable from the interior of the door, both of said locks being arranged so as to rest against or connect with the bolt-work, the time-lock being automatically unlocked by the operation of the time-movement, both of said locks being independent of each other, and arranged to control the locking and unlocking of the bolt-work, so that said safe or vault door cannot be opened when locked until both of said locks have been unlocked or have released their dogging action to enable the door to be opened, substantially as described.

In testimony that I claim the foregoing I have hereunto set my hand in the presence of two witnesses.

JAMES SARGENT.

Witnesses:
JAMES L. NORRIS,
JAMES M. WRIGHT, Jr.